Aug. 27, 1968   H. C. PAULSEN   3,398,717
THERMOPLASTIC DISPENSING MECHANISMS
Filed July 1, 1966   4 Sheets-Sheet 1

Inventor:
Hans C. Paulsen
By his Attorney
Richard A. Wise

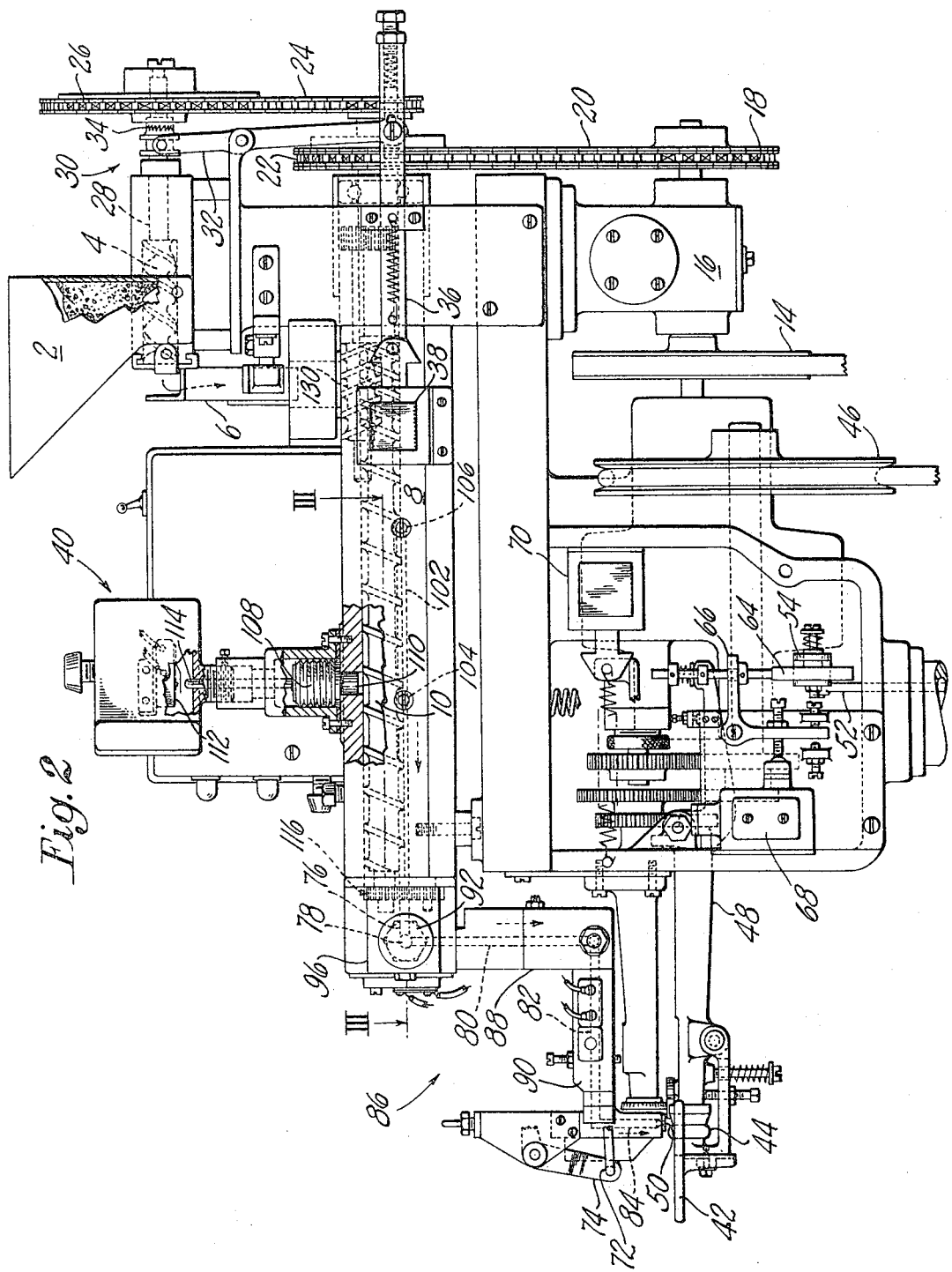

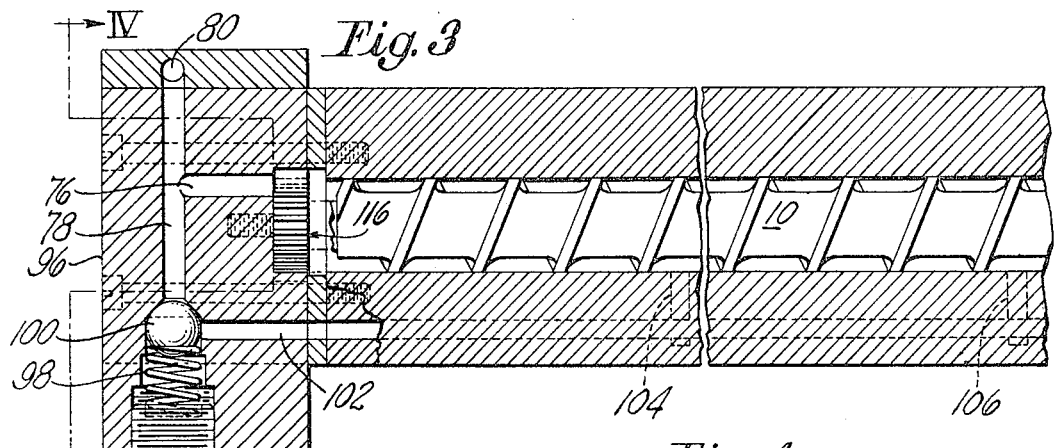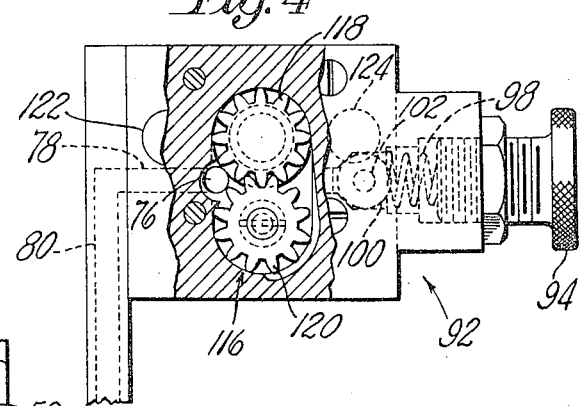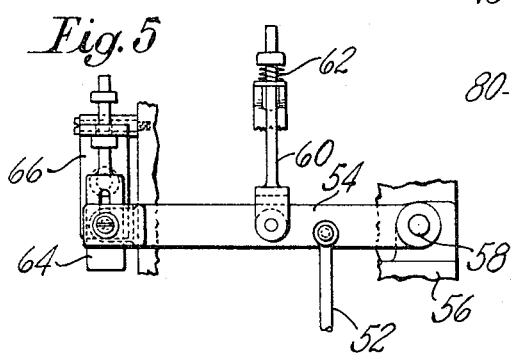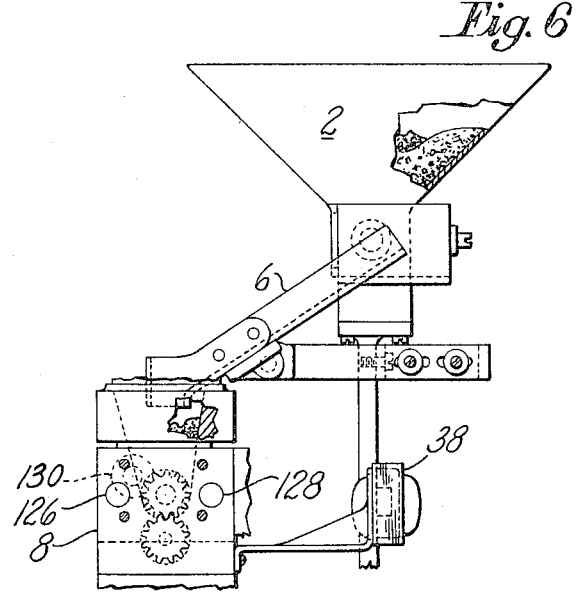

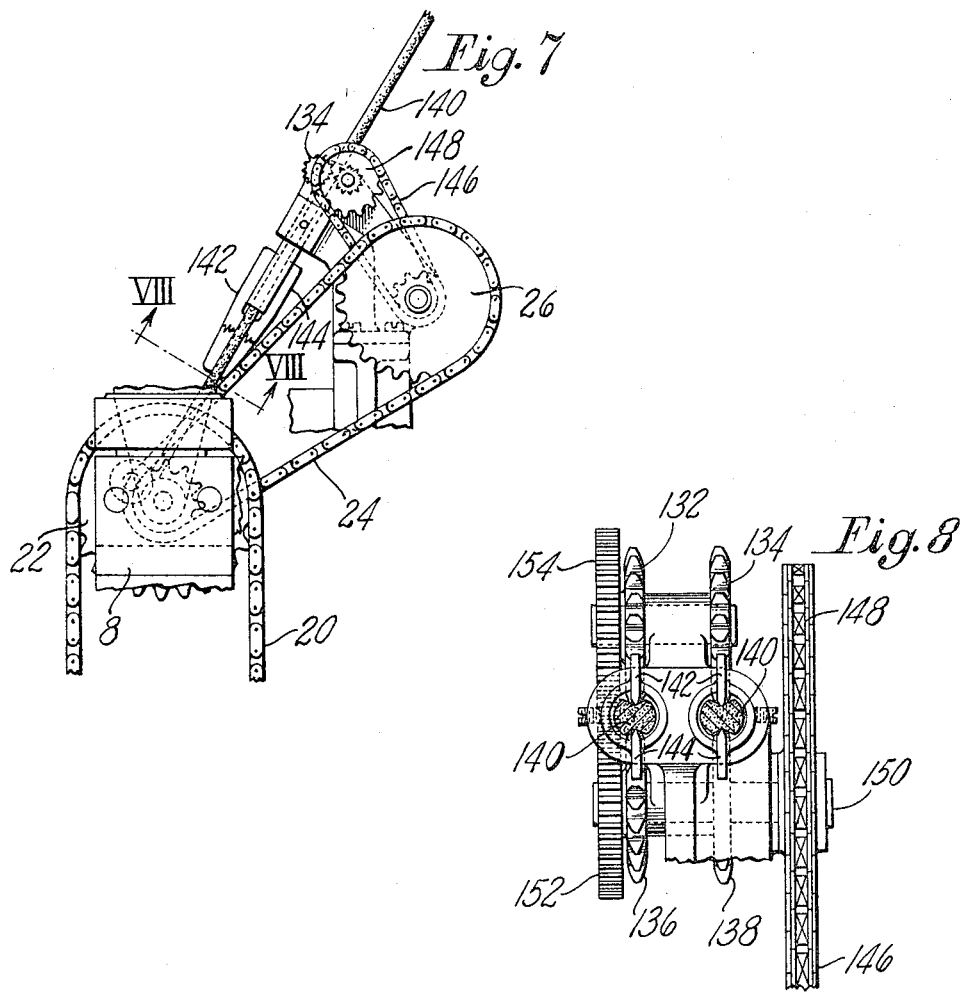

United States Patent Office 3,398,717
Patented Aug. 27, 1968

3,398,717
THERMOPLASTIC DISPENSING MECHANISMS
Hans C. Paulsen, Lexington, Mass., assignor to United
Shoe Machinery Corporation, Flemington, N.J., a corporation of New Jersey
Filed July 1, 1966, Ser. No. 562,254
6 Claims. (Cl. 118—7)

ABSTRACT OF THE DISCLOSURE

Apparatus for melting and feeding thermoplastic material consisting of an elongated, heated, housing having a pair of bores along the long dimension. One of the bores contains an extruder screw which takes solid material and forces it through the heated housing such that when the material leaves the screw it is in its molten state. Adjacent the exit of the extruder screw is a pumping means for selectively feeding the material to either a nozzle or to the second bore which recirculates the material to the entrance of the first bore in response to a pressure sensitive means in the first bore.

---

This invention relates to extruding mechanisms for molten plastic materials and is herein illustrated as embodied in mechanisms for feeding molten plastic material directly onto shoe portions to be cemented.

Numerous plastic materials are applicable to the manufacture of shoes and can be employed, when softened, as adhesives for attaching shoe parts. A problem with such materials is to keep the plastic at a proper temperature and readily available for application as needed. If such plastic materials are contained in a receptacle which is kept heated for a lengthy period, it has been found that there is considerable difficulty in preventing such an overheating of the materials as may readily cause a change in the characteristics thereof, especially that remaining in contact with the heater area. A change in physical characteristics often entails a great deal of difficulty in keeping the receptacle clean after the material has been softened and rehardened a number of times. One way of avoiding this difficulty is to provide the plastic material in a solid form and to deliver it a little at a time to an extruding machine which will heat the material, thereby softening it, and feed the softened plastic to the nozzle as needed. The feeding of solid plastic material to the melting chamber as needed eliminates the necessity for a large supply of molten material. With such an arrangement, the melting of the material takes place progressively along the length of the extruding mechanism, the latter being of sufficient length that the incoming material remains in the solid form while the extruded material is soft and pliable.

Extruding mechanisms generally of the type in use today comprise a feed screw operating in a heated passage between inlet and outlet openings. In machines of this type there is a tendency for the feed screw, at a point adjacent the inlet opening, to push the material toward one side where it may accumulate and become sufficiently softened to bridge, e.g. clog, the opening. To avoid this difficulty, the illustrative machine is provided with an auxiliary feed screw located slightly above and to the left of the principal feed screw which meshes with the principal feed screw at the inlet opening and turns in the opposite direction.

It is frequently desired, especially in the manufacture of shoes, to treat successive pieces of work, each requiring a small portion of the adhesive material and it is therefore desirable to have an extruding mechanism wherein the feed screw will not continue to force the molten adhesive to the extruder nozzle when no work piece is ready to receive the adhesive.

With this in mind, an object of this invention is to provide an extruding mechanism which automatically discontinues feeding the solid plastic material to the heating chamber when the operator has shut off the nozzle, thereby eliminating the possibility of a build-up of a great deal of back pressure.

This object is attained by providing midway between the inlet to the feed screw and the outlet to the working nozzle a pressure sensitive diaphragm which activates a microswitch and thus a solenoid turning off the mechanism which feeds the solid plastic material to the heating chamber.

A further object of this invention is to provide the molten plastic adhesive to the nozzle at a constant pressure, the pressure being determined by a relief or by-pass valve which opens to a passage leading back to the inlet end of the extruding screw receiving bore.

A still further object of this invention is to provide within the extruding mechanism means for continually circulating the molten plastic material thereby preventing an accumulation of such material near the heating elements.

As was pointed out above, excessive heating of the plastic material causes undesirable changes in the characteristics, a circumstance to be avoided if possible. The above objects are accomplished by having a by-pass valve with associated bores enabling the nozzle to be closed while the feed screw continues to rotate, forcing the plastic material through the by-pass valve and back toward the inlet portion of the heating chamber where it reenters the main heating chamber.

The above and other features of the invention including various novel details of construction and combinations of parts will now be more particularly described with reference to the accompanying drawings and pointed out in the claims.

In the drawings:

FIG. 2 is a side view of the machine shown in FIG. 1;

FIG. 3 is a planar sectional view partly broken away of a part of the machine, taken along lines III—III of FIG. 2 showing a by-pass valve structure;

FIG. 4 is a sectional view of the feeding structure taken along lines IV—IV of FIG. 3 showing a gear pump and pressure adjusting mechanism;

FIG. 5 is an enlarged view of a frictional lost motion device employed in the illustrative machine;

FIG. 6 is an enlarged view of a feed mechanism for particulate solid plastic;

FIG. 7 is an enlarged view of a feed mechanism for rod type plastic; and

FIG. 8 is a section taken along lines VIII—VIII of FIG. 7 showing the relationship between the drive wheels and the guide mechanism.

Figure 1:
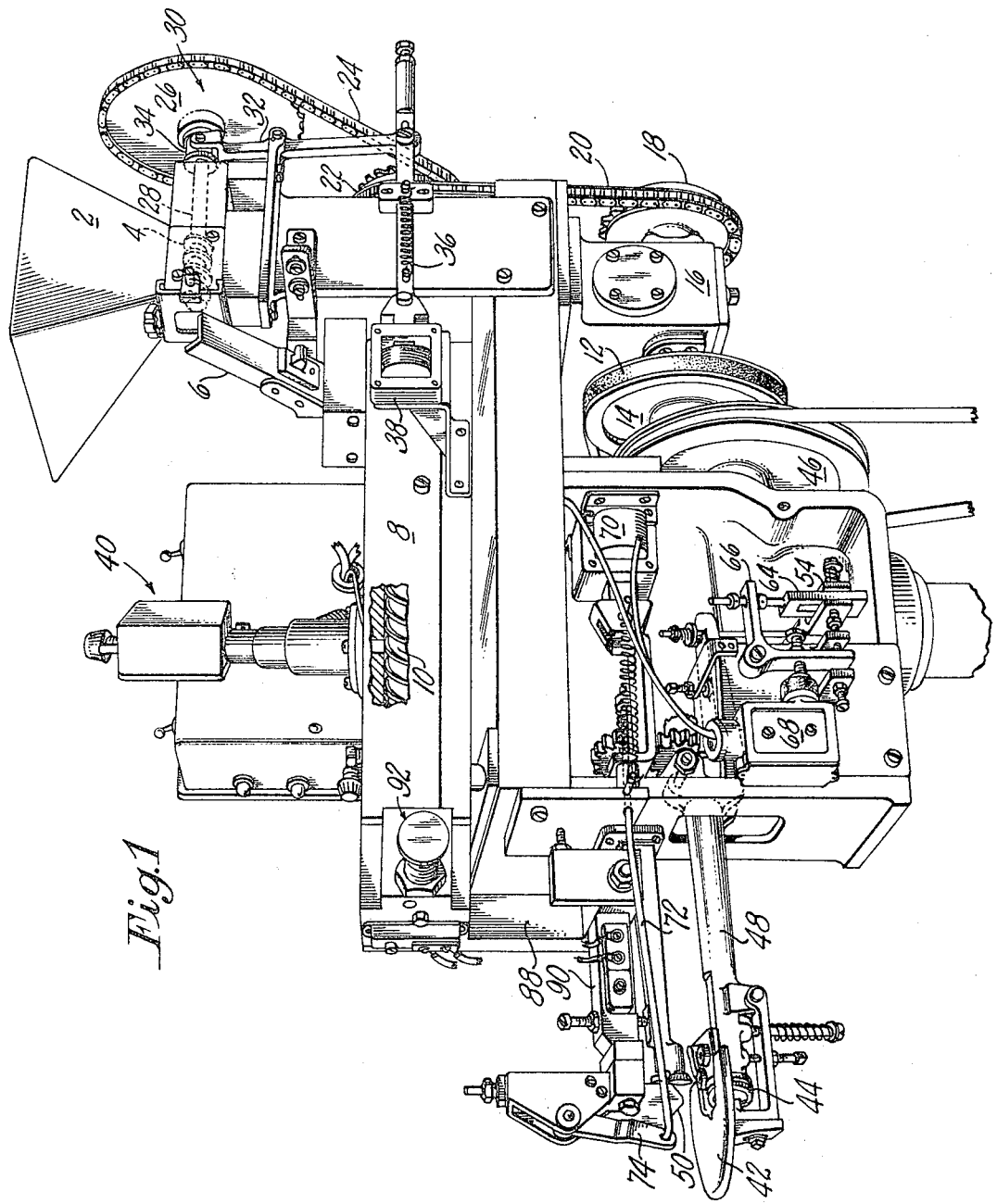
FIG. 1 is a perspective view partly broken away of a machine embodying one form of the invention.

A mechanism in the general nature of that used in the machine illustrative of the present invention, including a hopper, a feed screw and a heated chamber is described in detail in U.S. Patent No. 2,646,199, issued to Hans C. Paulsen and the reader is referred to this patent for specific details of the mechanism and its operation. In general, as can be seen in FIG. 1, there exists in this embodiment of the invention a hopper 2 which will directly feed by means of gravity granular plastic material to a worm 4 which in turn feeds the material as needed to a slideway 6 leading directly into a heating chamber 8 which includes a feed screw 10, both of which latter members will be described in more detail later. From the heating chamber, plastic melted in the feed chamber is fed to a suitable nozzle for applying the adhesive to the work piece.

Describing now the motivational force, there is mounted upon the frame of the mechanism an electric motor, not shown, which by means of belt 12, pulley 14, speed reduction box 16, sprocket wheel 18, sprocket chain 20 and sprocket wheel 22, continuously drives the feed screw 10. Sprocket wheel 22 further, by means of chain 24 and sprocket wheel 26, rotates shaft 28 upon which worm 4 is mounted. Connected to the shaft 28 which drives the worm 4 is a clutch mechanism 30 comprising a bifurcated, pivoted lever 32, clutch 34 and connecting rod 36 linking lever 32 with a solenoid 38. The solenoid 38 is energized and the clutch engaged in response to an impulse from a pressure sensitive switching mechanism 40 (to be described in greater detail hereinafter), which mechanism detects a drop in fluid pressure within the heating chamber 8, engages the clutch and feeds more material from hopper 2 into the chamber. The switch 40 is again actuated and the clutch is disengaged ceasing the feed of solid material when the fluid pressure in chamber 8 again reaches the desired level.

The illustrative machine includes as integral elements a work table and a nozzle mechanism which are described in detail in U.S. Patent No. 2,783,735 to Hans C. Paulsen, and the reader is referred thereto for specific details. For the purpose of this application, only a general description of the operation of the machine will be given.

When an operator desires to place adhesive upon a work piece, he locates the piece upon a work table 42 through which projects a rotating feed wheel 44 driven through conventional gearing mechanism by the continually rotating pulley 46 which is in turn driven by a motor, not shown. Depressing of a treadle, not shown, raises a pivotally mounted arm 48, upon which the work table 42 and the feed wheel 44 are mounted, to a position immediately below a nozzle 50. The upward displacement of the arm 48 enables the work piece to be carried by the moving wheel 44 while in contact with the nozzle 50, said nozzle also being opened by the depression of the foot treadle.

The mechanism through which the operator, by means of the treadle, operates the machine both raising and lowering arm 48 and controlling the nozzle can best be seen in FIG. 5. The mechanism comprises a vertical rod 52 directly connecting the treadle, not shown, with a linkage bar 54 which is pivotally fastened to the machine frame 56 at point 58 and rigidly linked to the inner end of the arm 48 by means of rod 60. Note that a spring 62 will absorb further motion of the treadle after the arm 48 has reached its maximum vertical position, such motion being necessary to control the nozzle flow. At the opposite end of the bar 54 from the pivot point 58 is located a frictional lost motion linkage which may perhaps best be seen in FIG. 1. The end of the bar 54 is bifurcated and is frictionally connected with a lost motion link 64 which allows the bar 54 to move through a predetermined distance before moving the link 64 which in turn moves an L-shaped pivotally mounted bar 66 which acts as a switch lever energizing switch 68 electrically connected to a solenoid 70. The solenoid 70 by means of a rod 72 and a lever 74 operates the valve located within nozzle 50, feeding adhesive only when the treadle is fully depressed, i.e. after a work piece is located directly beneath said nozzle on the work table 42. The use of the frictional lost motion device allows the operator to press the treadle raising the arm 48 into proper position before the adhesive is released through nozzle 50 and in turn immediately closes nozzle 50 thus stopping the adhesive flow as soon as the pressure on the treadle is released.

The nozzle 50 applies the molten plastic which is routed to the nozzle from the heating chamber 8 by means of interconnecting passages 76, 78, 80, 82 and 84 in a discharge head generally indicated 86 and including a vertical member 88 and horizontal member 90 which support the nozzle member 50, see FIG. 2. Since the pressure maintained in the heating chamber 8 will obviously be related to the amount of adhesive emitted from the nozzle 50, and the amount of adhesive in turn will vary with the material and/or area to which the adhesive is applied, a convenient pressure adjustment 92 is mounted in the discharge head 86 at the end of the heating chamber.

FIG. 3 shows in greater detail the pressure adjusting means referred to above and denoted generally by numeral 92. It comprises a knurled handle 94 threaded into a boss 96 forming part of the discharge head 86. Directly abutting the inner end of the adjusting means is a spring 98 and a ball 100. The spring and ball, operative to open a passage to a bore 102, are responsive to pressure within pasageway 78 sufficient to overcome the predetermined adjustable spring compression. Bore 102 paralleling feed screw 10 in turn has cross bores 104, 106 which will feed material from bore 102 back into the main heating chamber 8. Forcing the plastic back into engagement with the continually rotating feed screw 10 assures continual agitation of the molten plastic and helps to maintain the desired character of the plastic.

As can best be seen in FIG. 2, the pressure responsive switching mechanism 40 comprises a flexible diaphragm 108 directly exposed to the pressure within the heating chamber 8 by means of an aperture 110. The diaphragm 108, expanding in response to a build-up of pressure within the heating chamber closes a switch 112 by means of a rod 114 and deenergizes the solenoid 38 which in turn disengages the worm 4.

Located at the exit end of heating chamber 8 in the boss 96 is a gear pump mechanism 116, best seen in FIG. 4, which consists simply of two gears 118 and 120 driven by the feed screw 10 which receive molten adhesive from the feed screw 10 and force it into bore 76 which in turn directly communicates with bore 78. Bore 78 alternatively leads to bores 80 and 102. It will be seen that bore 78 leads to bore 102 by-passing the pressure adjusting means 92 whereas bore 80 leads to nozzle 50.

The combination of the feed screw 10, bores 76, 78, 102, 104 and 106 and the pressure adjusting mechanism 92 allows the feed screw 10 to continually rotate within the heating chamber 8 even though the nozzle has been closed. As the feed screw 10 rotates continuously circulating molten adhesive and the gear pump 116 continues to force the molten adhesive into the bore 76, the back pressure builds up when the nozzle 50 is closed. The build-up of pressure forces the adhesive to take the alternate route passing by the pressure adjusting means 92 and into bore 102 and associated bores 104, 106 thus recirculating the molten adhesive, keeping it in a proper fluid condition until it is needed.

As can further be seen in FIG. 4, heaters 122 and 124, which are standard resistance type heaters, may be inserted into the casing of heating chamber 8. For simplicity they are shown only schematically in this view, it being understood that they may be of any desired length and may be placed at any desirable position along the heating chamber 8. It is believed that the placement of the heaters, the type of heaters used and the capacity of heaters are all choices well within the scope of one skilled in the art.

The arrangement of the hopper feeding device can be seen from another angle in FIG. 6 which more clearly points out the relationship between the hopper 2, slideway 6 and the heating chamber 8. It can further be seen that the receiving end of the heating chamber 8 is adapted to receive heaters 126 and 128.

A feed screw 130 is mounted above and to the left of feed screw 10 and driven by feed screw 10 through a pair of standard gears (see FIG. 6). The combination of feed screw 130 and feed screw 10 turning in opposite directions eliminates the problem of adhesive being forced to one side of the heating chamber and forming a stationary bridge at the receiving end of the heating chamber.

FIGS. 7 and 8 show an alternative form of feed mechanism to be used in applicant's apparatus. This mechanism, being driven and controlled by the same arrangement as in the supply device already described, comprises feed wheels 132, 134, 136, 138 which have teeth enabling them to grip a rod form of the adhesive 140, force it through guide members 142, 144 and then into the opposite turning feed screws 10 and 130. The alternative form, receiving motivation from sprocket wheel 26 through chain 146 which in turn drives sprocket wheel 148 could handle several rods of cement. The drive wheels 132, 134, 136, 138 are simultaneously driven through shaft 150, upon which sprocket wheel 148 is mounted, and standard gears 152 and 154. Lengthening of shaft 150 and adding more feed wheels is all that is necessary to adapt this machine for handling more rods of cement.

It will be understood that the particular machine embodying the invention is shown by way of illustration only and not as a limitation of the invention. The principles and features of this invention may be employed in varied and numerous embodiments without departing from the scope of the invention.

Having thus described my invention, what I claim as new and desire to secure by Letters Patent of the United States is:

1. Apparatus for melting and feeding thermoplastic material comprising a heated housing having a bore with an outlet and an inlet, an extruder screw rotatable within said bore for carrying solid thermoplastic material away from said inlet and for delivering molten thermoplastic material through said outlet, pump means adjacent said outlet, and mechanism for feeding solid thermoplastic material through the inlet to said screw, in combination with means responsive to variations in the pressure of molten material within said bore adjacent to the screw, at a point between the inlet and outlet, for controlling the operation of said solid material feeding mechanism.

2. An apparatus as in claim 1 wherein the mechanism for feeding thermoplastic material through the inlet comprises a power-driven feed screw for feeding solid particulate thermoplastic material.

3. An apparatus as in claim 1 wherein the mechanism for feeding thermoplastic material through the inlet comprises power-driven feed wheels for feeding the leading end of a flexible, solid rod of thermoplastic material.

4. An apparatus as in claim 1 including a nozzle connected to the outlet, means for controlling the flow of molten material through the nozzle, said housing having a second bore extending from a point adjacent to the outlet back to a point between the outlet and the inlet for recirculating molten adhesive when said nozzle is restricted.

5. An apparatus as in claim 1 including a closable nozzle means connected to the outlet of said bore for placing the material upon a workpiece.

6. Apparatus for melting and feeding thermoplastic material comprising a heated housing having at least two bores substantially parallel, an extruder screw rotatable within the first bore to carry solid thermoplastic material away from an inlet and to deliver molten thermoplastic material through an outlet, means responsive to pressure in the first bore to control the supply of material to said bore, pumping means for receiving the molten thermoplastic from the outlet of the first bore and increasing the pressure upon the material, means connecting the pumping means to a nozzle means, the inlet of the second bore adjacent the exit of and connected to the pumping means, the outlet of the second bore connected to the first bore remote from its outlet, means at the inlet of the second bore to admit the molten thermoplastic to said bore only upon closing of the nozzle and the buildup of a predetermined pressure by the pump means whereby the molten material is pumped through the nozzle when the nozzle is open and is pumped through the second bore when the nozzle is closed causing the molten material to recirculate and maintain proper consistency.

References Cited

UNITED STATES PATENTS

| | | | |
|---|---|---|---|
| 1,595,470 | 8/1926 | Johnson | 18—12 X |
| 2,568,332 | 9/1951 | Genovese. | |
| 2,646,199 | 7/1953 | Paulsen | 222—413 X |
| 2,787,241 | 4/1957 | Kelley | 118—7 |
| 2,871,516 | 2/1959 | Sherman et al. | 18—30 |
| 3,028,833 | 4/1962 | Hummel | 118—7 |

CHARLES A. WILLMUTH, *Primary Examiner.*

JOHN P. McINTOSH, *Assistant Examiner.*